US008809714B2

(12) United States Patent
Kunitachi

(10) Patent No.: US 8,809,714 B2
(45) Date of Patent: Aug. 19, 2014

(54) SWITCHING DEVICE AND INSTRUMENT HAVING THE SAME

(75) Inventor: Ryo Kunitachi, Kariya (JP)

(73) Assignee: Denso Corporation, Kariya (JP)

( * ) Notice: Subject to any disclaimer, the term of this patent is extended or adjusted under 35 U.S.C. 154(b) by 277 days.

(21) Appl. No.: 13/134,008

(22) Filed: May 25, 2011

(65) Prior Publication Data

US 2011/0290626 A1 Dec. 1, 2011

(30) Foreign Application Priority Data

May 27, 2010 (JP) .................................. 2010-121886
Apr. 13, 2011 (JP) .................................. 2011-89439

(51) Int. Cl.
H01H 3/20 (2006.01)
H01H 13/70 (2006.01)
B60K 37/02 (2006.01)
H01H 3/12 (2006.01)
B60K 37/06 (2006.01)

(52) U.S. Cl.
CPC .................. B60K 37/02 (2013.01); H01H 3/12 (2013.01); B60K 37/06 (2013.01); B60K 2350/102 (2013.01)
USPC ......................................... 200/330; 200/345

(58) Field of Classification Search
CPC .................. H01H 3/122; H01H 3/12
USPC ........................ 200/330, 331, 341, 345, 520
See application file for complete search history.

(56) References Cited

U.S. PATENT DOCUMENTS

| 3,829,632 | A | * | 8/1974 | Klehm, Jr. ..................... 200/5 A |
| 4,439,646 | A | * | 3/1984 | Bouvrande ..................... 200/5 A |
| 4,755,645 | A | * | 7/1988 | Naoki et al. ................... 200/290 |
| 5,168,982 | A | * | 12/1992 | Hakanen et al. .............. 200/342 |

FOREIGN PATENT DOCUMENTS

| JP | 7-324951 | | 12/1995 | |
| JP | 11-344362 | | 12/1999 | |
| JP | 2000149704 | A * | 5/2000 | ............ H01H 13/14 |
| JP | 2001-110270 | | 4/2001 | |
| JP | 2006-123850 | | 5/2006 | |

OTHER PUBLICATIONS

Office action dated Feb. 28, 2012 in corresponding Japanese Application No. 2011-089439 with English translation.
Office Action dated Jun. 5, 2013 in the corresponding CN Application No. 201110140278.5 with English translation thereof.
Office action dated Jan. 13, 2014 in corresponding Chinese Application No. 201110140278.5.

* cited by examiner

Primary Examiner — Felix O Figueroa
(74) Attorney, Agent, or Firm — Harness, Dickey & Pierce, PLC

(57) ABSTRACT

A manipulation knob is molded from a resin material and is manually depressible by a user. A switch is depressible through the manipulation knob to execute a corresponding switching operation when the manipulation knob is depressed by the user. The manipulation knob includes a resin spring portion, which is molded integrally with the manipulation knob and projects in an axial direction of the manipulation knob. The resin spring portion is resilient and is adapted to exert a resilient reaction force against the switch when the manipulation knob is depressed by the user to depress the switch.

21 Claims, 3 Drawing Sheets

SWITCHING DEVICE AND INSTRUMENT HAVING THE SAME

CROSS REFERENCE TO RELATED APPLICATION

This application is based on and incorporates herein by reference Japanese Patent Application No. 2010-121886 filed on May 27, 2010 and Japanese Patent Application No. 2011-89439 filed on Apr. 13, 2011.

BACKGROUND OF THE INVENTION

1. Field of the Invention

The present invention relates to a switching device and an instrument having the same.

2. Description of Related Art

Japanese Patent No. 2953492B2 teaches a switching device of a vehicle instrument. In this switching device, a manipulation knob is provided to operate a switch, and resin springs are provided in parallel to the switch to urge the manipulation knob away from the switch in an axial direction of the manipulation knob.

Furthermore, Japanese Unexamined Patent Publication No. 2006-123850A recites a vehicle instrument, which can improve a reliability of soldering of a terminal of a switch. In this vehicle instrument, the switch is installed to a circuit board of the vehicle instrument, and a manipulation knob is received in a hole of a front cover of the vehicle instrument in such a manner that the manipulation knob is movable forward or backward in an axial direction of the manipulation knob and is rotatable about a central axis of the manipulation knob.

In Japanese Unexamined Patent Publication No. 2006-123850A, when the manipulation knob is rotated about the central axis of the manipulation knob, an operable portion of the switch is rotated. Furthermore, when the manipulation knob is depressed in the axial direction, the operable portion of the switch is depressed. The manipulation knob is tiltably installed to the operable portion of the switch, and a metal spring (coil spring), which urges the manipulation knob against one side of an inner peripheral portion of the hole of the front cover, is provided. The metal spring is provided separately from the manipulation knob and is placed parallel to the switch.

In Japanese Patent No. 2953492B2, the resin springs are provided in parallel to the switch. Furthermore, in Japanese Unexamined Patent Publication No. 2006-123850A, the metal spring is provided separately from the manipulation knob and is provided parallel to the switch. As discussed above, in the prior art techniques, the spring, which holds the manipulation knob, is the metal spring or the resin spring.

In the case of the metal spring, an additional cost of the metal spring is disadvantageously added, and an additional step of assembling the metal spring is disadvantageously required. Thereby, the costs are disadvantageously increased. In the case where the resin springs are provided in parallel to the switch, a size of the manipulation knob arrangement (including the manipulation knob and the springs) measured in a direction perpendicular to the axial direction of the manipulation knob is disadvantageously increased, so that an installation space, which is required to install the manipulation knob arrangement, which includes the manipulation knob and the springs, is disadvantageously increased, and thereby there is a spatial limitation with respect to placement of the components, resulting a limited design freedom.

SUMMARY OF THE INVENTION

The present invention addresses the above disadvantages. Thereby, it is an objective of the present invention to provide a switching device, which enables at least one of a reduction in costs thereof and a reduction in a size thereof. It is another objective of the present invention to provide an instrument for vehicle having such a switching device.

According to the present invention, there is provided a switching device for an instrument. The switching device includes a manipulation knob and a switch. The manipulation knob is molded from a resin material and is manually depressible, i.e., is depressible by a hand of a user. The switch is depressible through the manipulation knob to execute a corresponding switching operation when the manipulation knob is depressed by the user. The manipulation knob includes a resin spring portion, which is molded integrally with the manipulation knob and projects in an axial direction of the manipulation knob. The resin spring portion is resilient and is adapted to exert a resilient reaction force against the switch when the manipulation knob is depressed by the user to depress the switch.

According to the present invention, there is also provided an instrument for a vehicle. The instrument includes the switching device described above and an indicator. An operational mode of the indicator is changeable through the switching device.

BRIEF DESCRIPTION OF THE DRAWINGS

The invention, together with additional objectives, features and advantages thereof, will be best understood from the following description, the appended claims and the accompanying drawings in which:

DETAILED DESCRIPTION OF THE INVENTION

Figure 1:
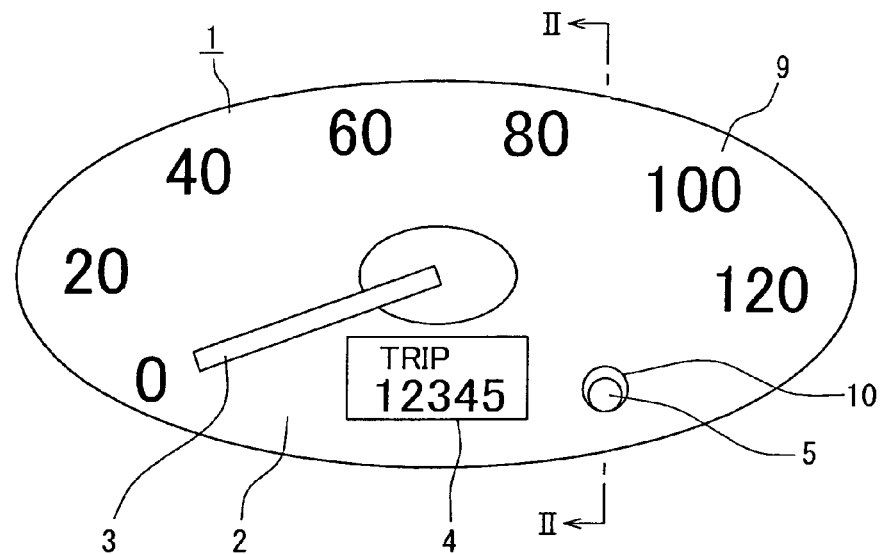
FIG. 1 is a schematic front view of an instrument (speedometer) of a vehicle according to an embodiment of the present embodiment.
Figure 2:
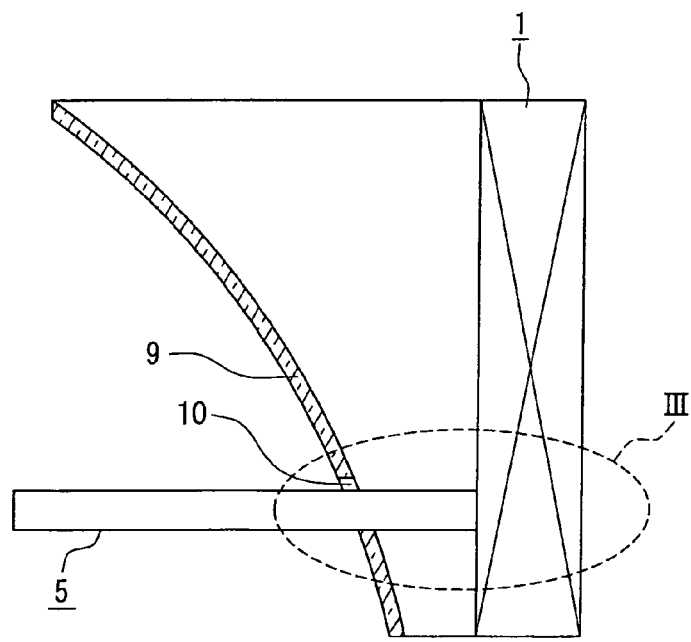
FIG. 2 is a cross-sectional view taken along line II-II in FIG. 1.

An embodiment of the present invention will be described with reference to FIGS. 1 to 5. According to the present embodiment, as shown in FIGS. 1 and 2, an instrument of the present invention is implemented as a speedometer 1, which is installed to an instrument panel (dashboard) that is placed at a front side of a passenger compartment of a vehicle (e.g., an automobile). FIG. 1 is a schematic front view of the speedometer 1 of the present embodiment. FIG. 2 is a cross-sectional view taken along line II-II in FIG. 1.

The speedometer 1 is a pointer instrument, which indicates a vehicle speed. The speedometer 1 includes a gauge plate (instrument plate) 2 and a pointer (needle) 3. The pointer 3 is pivotably supported to pivot over the gauge plate 2 to indicate a corresponding vehicle speed based on a measured vehicle speed. A digital odometer/trip meter (indicator) 4 is placed at a lower part of the speedometer 1. The odometer/trip meter 4 has a function of an odometer, which indicates a total travel distance of the vehicle, and a function of a trip meter, which can be set back to zero to indicate a distance of a particular trip. These two functions are switchable one after another through manipulation of a manipulation knob 5.

The manipulation knob (also referred to as a trip knob) 5 is placed at the right lower part of the speedometer 1 in FIG. 1. The manipulation knob 5 is configured into a rod form and is manipulatable by an occupant (driver), i.e., a user of the vehicle to manipulate a switch 7 of the odometer/trip meter 4. The manipulation knob 5, which includes a resin spring portion 25e described below, is molded integrally from a resin material (more specifically, polyacetal resin that is abbreviated as POM).

Figure 3:
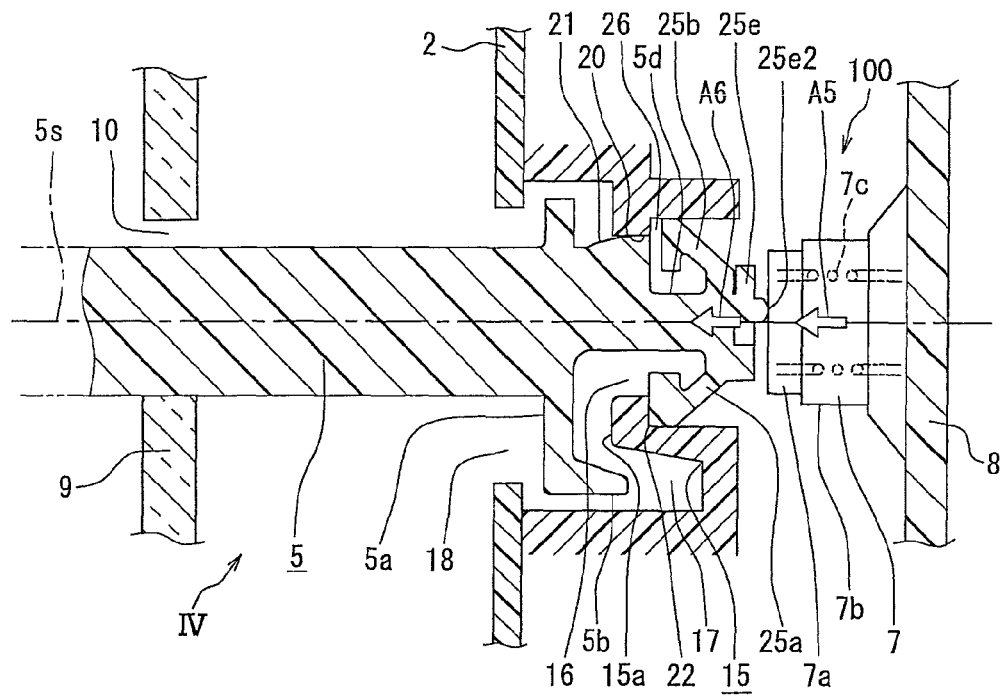
FIG. 3 is a partial enlarged cross-sectional view indicating an area III of FIG. 2, showing an area around a distal end portion of a manipulation knob.

FIG. 3 is a partial enlarged cross-sectional view indicating an area III of FIG. 2, showing an area around a distal end portion of the manipulation knob 5. With reference to FIG. 3, the switch 7, which serves as an odometer/trip meter switch, is provided to change the display of the odometer/trip meter 4 of FIG. 1 or to reset the trip meter through a press operation thereof by the occupant. The switch 7 is soldered to a printed circuit board 8 at two sides of the switch 7, which contact the printed circuit board 8. The switch 7 is configured into a two-step cylindrical form. Specifically, a cylindrical switch housing 7b of the switch 7 is soldered to the printed circuit board 8, and a spring (coil spring) 7c is received in the inside of the switch housing 7b. A cylindrical switch head 7a of the switch 7 is axially movably received in the switch housing 7b and is urged by the spring 7c toward the manipulation knob 5.

When the switch head 7a is depressed toward the right side in FIG. 3, the spring 7c is compressed to allow depression of the switch head 7a toward the inside of the switch housing 7b. Thereby, the switch 7 is placed in a switched-on state to output a contact signal, i.e., a switched-on signal (thereby executing a corresponding switching operation). For instance, in response to the contact signal, an indicating mode of the odometer/trip meter 4 may be changed from, for example, the odometer to the trip meter, and vice versa. Alternatively, in the state where the trip meter is displayed on the odometer/trip meter 4, when the manipulation knob 5 is depressed longer than a predetermined time period, the indication of the trip meter may be reset to zero. When the depression of the switch head 7a is terminated to place the switch 7 in a switched-off state, i.e., when the switch head 7a is released from the switched-on state, the switch head 7a is urged by the spring 7c toward the left side in FIG. 3. Thereby, the switch 7 is placed in the switched-off state to stop the output of the contact signal. The contact signal is inputted to an undepicted electronic control unit (ECU), which includes a microcomputer that has a CPU, a ROM and a RAM.

Signals of various sensors are inputted to the microcomputer through an input circuit as vehicle information. Also, other vehicle information is supplied to the microcomputer through communication with other ECUs of the vehicle via a communication network (e.g., a controller area network abbreviated as CAN). The microcomputer executes the above-discussed display switch control operation of the odometer/trip meter 4 of FIG. 1 based on the inputted vehicle information and the input signal (switched-on signal or switched-off signal) from the switch 7.

As shown in FIGS. 1 and 2, the manipulation knob 5 extends through a through-hole 10 of a lens member (transparent cover) 9, which serves as a transparent surface member of the speedometer 1. The distal end portion (more specifically, a cylindrical protrusion 25e2 of the resin spring portion 25e described below in detail) of the manipulation knob 5 contacts the switch head 7a of the switch 7, which is installed to the printed circuit board 8 of the speedometer 1.

The switch head 7a of the switch 7 is resiliently urged by the spring 7c in the direction away from the printed circuit board 8 and can be moved toward or away from the inside of the switch housing 7b, as discussed above. When the switch head 7a is depressed toward the right side in FIG. 3, the switch head 7a is depressed toward the inside of the switch housing 7b while exerting a resilient reaction force in a direction opposite from the depressing direction of the switch head 7a. When the amount of depression of the switch head 7a reaches a predetermined amount, the switch 7 is switched on. In this embodiment, the switch 7 is a switch that does not provide a click feeling.

In FIG. 3, the manipulation knob 5 is tilted such that the manipulation knob 5 contacts one side (lower side in FIG. 3) of an inner peripheral portion of the through-hole 10 of the lens member 9 while the manipulation knob 5 is spaced from the opposite side (upper side in FIG. 3) of the inner peripheral portion of the through-hole 10, which is opposite from the one side of the inner peripheral portion of the through-hole 10 of the lens member 9 in a direction perpendicular to the axial direction of the manipulation knob 5. The lens member 9 is made of a water-clear transparent synthetic resin material. The driver of the vehicle views the gauge plate 2 and the pointer 3 through the lens member 9.

As shown in FIG. 3, the manipulation knob 5 extends through an opening 16 of a case 15, which is connected to the gauge plate 2. The manipulation knob 5 has a flange 5a, which is placed near an inlet of the opening 16 of the case 15 upon installation of the manipulation knob 5 to the case 15. A bent portion 5b, which determines an installation orientation (angular position) of the manipulation knob 5 relative the case 15, is formed integrally with the flange 5a.

The bent portion 5b is configured into a hook shape and is accommodated in a groove 17 of the case 15. The bent portion 5b is a foolproof structure, which prevents erroneous installation of the manipulation knob 5 in such a manner that the manipulation knob 5 cannot be installed in place unless the bent portion 5b is received into the groove 17.

The flange 5a serves as a masking portion formed integrally with the manipulation knob 5 to mask a white color surface of the case 15, which is located at a bottom side (the right side in FIG. 3) of a recess 18 of the case 15.

Furthermore, the manipulation knob 5 includes an arcuate ridge (arcuate outer portion) 21, which slidably contacts an inner peripheral wall surface (radial inner end surface) 20 of an annular projection (support portion) 15a that radially inwardly projects from the rest of the case 15 and extends circumferentially like a ring. When the manipulation knob 5 is tilted, the arcuate ridge 21 slides on the inner peripheral wall surface 20 of the annular projection 15a of the case 15.

An arc of the arcuate ridge 21 (an arcuate outer surface of the arcuate ridge 21) is formed as a segment of an imaginary circle, i.e., is formed to extend along the imaginary circle, which has a center located in a fulcrum portion 22. Since the arcuate ridge 21 is configured to have the arcuate shape, the manipulation knob 5 can be smoothly tilted about the fulcrum portion 22. Therefore, it is possible to limit a non-continuous motion of the manipulation knob 5.

Furthermore, the manipulation knob 5 includes a projection (reduced diameter portion) 5d, which axially projects from the flange 5a toward the switch 7 and has a reduced size in the direction perpendicular to the axial direction of the manipulation knob 5 in comparison to a proximal portion (left portion in FIG. 3) of the manipulation knob 5. Two resilient claws, i.e., first and second resilient claws 25a, 25b radially outwardly extend from a distal end part of the projection 5d and axially project away from the distal end part of the projection 5d, i.e., away from the switch 7 toward the annular ridge 15a, so that the first and second resilient claws 25a, 25b are diametrically opposed to each other about the central axis 5s of the manipulation knob 5 to have a V-shape configuration. The first and second resilient claws 25a, 25b are formed integrally with the projection 5d of the manipulation knob 5 and are placed between the resin spring portion 25e of the manipulation knob 5 and the annular projection 15a of the case 15 in the axial direction of the manipulation knob 5. When the manipulation knob 5 is inserted into the opening 16, the first and second resilient claws 25a, 25b are resiliently, radially inwardly urged by the annular projection 15a to have a reduced size measured in the direction perpendicular to the axial direction of the manipulation knob 5 and are then resiliently, radially outwardly expanded, i.e., sprung back to have an increased size measured in the direction perpendicular to the axial direction of the manipulation knob 5.

The first and second resilient claws 25a, 25b have different axial heights (different axial extents), respectively, which are measured from the distal end part of the projection 5d, so that a projecting end portion of the first resilient claw 25a forms the fulcrum portion 22, about which the manipulation knob 5 is tiltable upon receiving a reaction force through the resin spring portion 25e in response to the resilient force.

As discussed above, the size of the first resilient claw 25a and the size of the second resilient claw 25b are different from each other. Specifically, the projecting end portion of the first resilient claw 25a, which is located at the lower side in FIG. 3, contacts a side wall surface (a right side wall surface in FIG. 3) of the annular projection 15a of the case 15 on the switch 7 side of the annular projection 15a. In contrast, a gap 26 is axially provided between the second resilient claw 25b and the side wall surface (the right side wall surface in FIG. 3) of the annular projection 15a of the case 15, so that the second resilient claw 25b does not contact the side wall surface (the right side wall surface in FIG. 3) of the annular projection 15a of the case 15, i.e., the projecting end portion of the second resilient claw 25b is axially spaced away from the annular projection 15a.

Once the first and second resilient claws 25a, 25b are inserted into the opening 16 of the case 15 beyond the annular projection 15a, the first and second resilient claws 25a, 25b are sprung back away from each other, so that removal of the manipulation knob 5 from the opening 16 is limited by the annular projection 15a, to which the first resilient claw 25a contacts.

Figure 4:
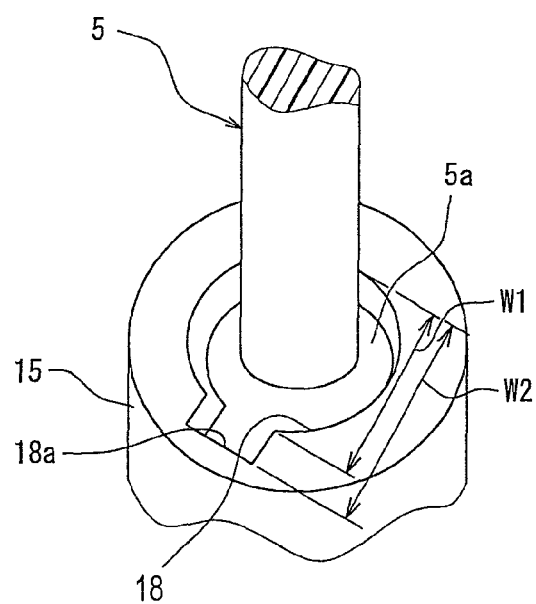
FIG. 4 is a partial perspective view taken in a direction of an arrow IV in FIG. 3, showing a configuration of a recess of a case before the time of installing a gauge plate.

FIG. 4 is a perspective view taken in a direction of an arrow IV in FIG. 3, showing the configuration of the recess 18 of the case 15 before the time of installing the gauge plate 2. The recess 18 of the case 15 is configured into a keyhole shape. Specifically, in the recess 18, a portion of a circular hole, which has a diameter W1 (e.g., 10.5 mm in this instance), is radially outwardly recessed to form a radially outwardly recessed portion 18a having a rectangular shape. Therefore, a size W2 (e.g., 12.5 mm in this instance) of the recess 18, which is measured at this radially outwardly recessed portion 18a in the diametrical direction of the recess 18, is larger than the diameter W1. The bent portion 5b of the manipulation knob 5 of FIG. 3 is received in the radially outwardly recessed portion 18a.

The recess 18 of the keyhole shape serves as a guide, which guides the manipulation knob 5, so that the manipulation knob 5 can be appropriately installed in place in the recess 18 and thereby in the opening 16. That is, with the recess 18 of the keyhole shape, it is possible to determine the installation orientation (angular position) of the manipulation knob 5 relative to the case 15.

Figure 5:
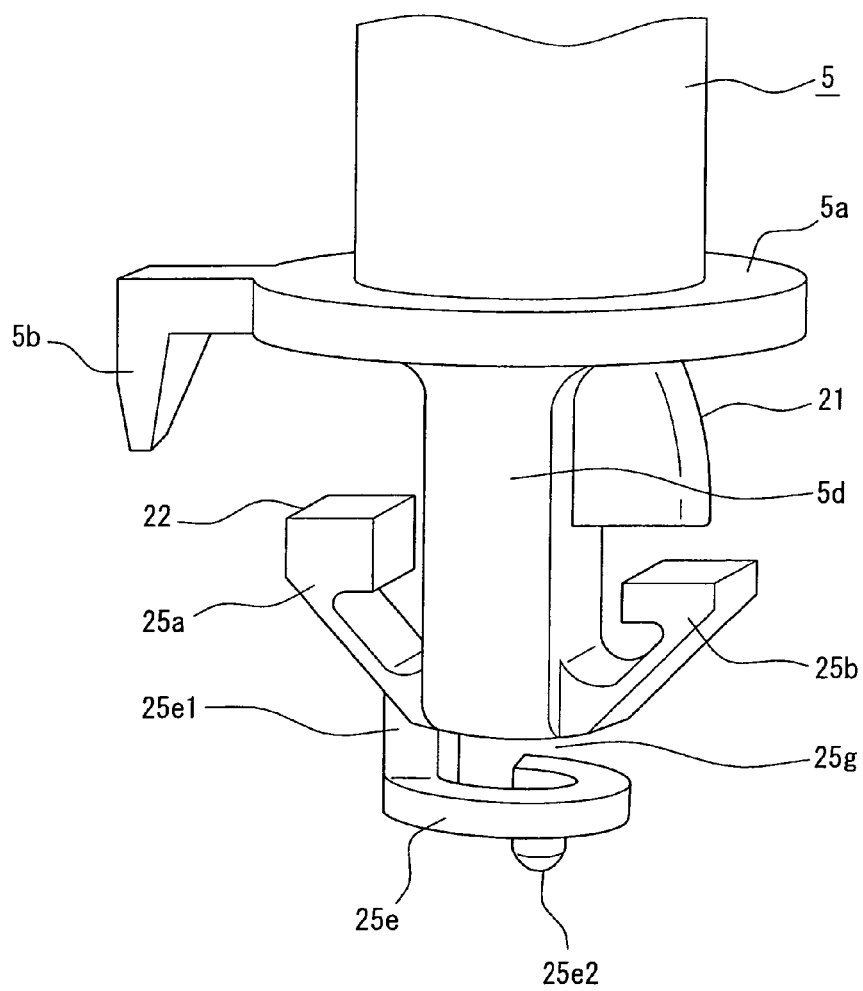
FIG. 5 is a partial enlarged view showing the distal end portion of the manipulation knob of the embodiment.

The resin spring portion 25e, which is configured into a spiral shape, is formed continuously at the distal end part of the projection 5d of the manipulation knob 5 of FIG. 3 as the integral part of the manipulation knob 5 with the same resin material as that of the manipulation knob 5. FIG. 5 is a partial enlarged view showing the distal end portion of the manipulation knob 5. The axial end surface (upper end surface in FIG. 5) of the projecting end portion of the first resilient claw 25a, which faces the flange 5a, forms the fulcrum portion 22.

A resin thin piece 25e1, which is configured into a planar plate shape, axially projects from the first resilient claw 25a, which is formed integrally with the projection 5d. The resin spring portion 25e, which is configured into the spiral form, is formed integrally with the resin thin piece 25e1 and axially spirally projects from the resin thin piece 25e1. The cylindrical protrusion (projecting end part) 25e2 is formed at the distal end of the resin spring portion 25e to contact the switch head 7a of the switch 7 shown in FIG. 3.

In a free state of the resin spring portion 25e, a gap 25g is axially formed between the projection 5d and the resin spring portion 25e, as shown in FIG. 5. However, in the assembled state of the manipulation knob 5 shown in FIG. 3, the resin spring portion 25e is pressed against the projection 5d, so that the gap 25g becomes 0 mm and is thereby eliminated. This is made possible by setting a spring constant of the resin spring portion 25e to be smaller than a spring constant of the spring 7c of the switch 7. In other words, the resin spring portion 25e is softer than the spring 7c of the switch 7.

An operation of the embodiment will be described. In FIG. 3, the manipulation knob 5 is inserted into the recess 18 and the opening 16 of the case 15 such that the first and second resilient claws 25a, 25b are radially outwardly expanded. In this state, the cylindrical protrusion 25e2, which is located at the distal end of the resin spring portion 25e that is configured into the spiral form, contacts the switch head 7a of the switch 7.

In this state, the reaction force is exerted to the cylindrical protrusion 25e2, which is located at the distal end of the resin spring portion 25e, from the spring 7c received in the inside of the switch housing 7b through the switch head 7a in the direction of the arrow A5 in FIG. 3. At this time, the fulcrum portion 22 of the first resilient claw 25a contacts the side wall surface of the annular projection 15a of the case 15. Therefore, even when the manipulation knob 5 is urged by the reaction force (also referred to as a preload), the manipulation knob 5 is moved only within a tiltable range of the manipulation knob 5 and a deformable range of the resin spring portion 25e.

The resin spring portion 25e is urged by the reaction force (preload) of the switch 7 and exerts a resilient reaction force in a direction of an arrow A6 in FIG. 3. The dimensional settings of the switch 7, the manipulation knob 5 and the case 15 are made such that the switch 7 is not yet turned on in this state. The cylindrical protrusion 25e2, which is located at the distal end of the resin spring portion 25e, is deviated upwardly from the central axis 5s of the manipulation knob 5 in FIG. 3. In other words, the cylindrical protrusion 25e2 is located on the one side of the central axis 5s of the manipulation knob 5, which is opposite from the fulcrum portion 22 in the direction perpendicular to the central axis 5s of the manipulation knob 5.

The fulcrum portion 22 is formed on the lower side of the central axis 5s, which is opposite from the upper side of the central axis 5s where the cylindrical protrusion 25e2 is located. Therefore, the manipulation knob 5 can be effectively tilted by the reaction forces indicated by the arrows A5, A6 in FIG. 3, and the manipulation knob 5 can be held such that the manipulation knob 5 contacts the one side (lower side in FIG. 3) of the inner peripheral portion of the through-hole 10 of the lens member 9.

The resin spring portion 25e is placed next to the switch 7 in a switching direction of the switch 7 (the axial direction of the manipulation knob 5), i.e., is placed next to the switch 7 in tandem or, in series. The required reaction force, which is required to hold the manipulation knob 5 in the state shown in FIG. 3, is provided by the reaction force (preload) of the switch 7 and the reaction force of the resin spring portion 25e. In other words, the reaction force of the switch 7 (i.e., the reaction force of the spring 7c) is supplemented by the reaction force of the resin spring portion 25e.

Furthermore, the first and second resilient claws 25a, 25b, which are made of the resin, are radially inwardly compressed at the time of inserting the resin spring portion 25e into the opening 16 and are then radially outwardly expanded upon the installation of the resin spring portion 25e in place in the opening 16 while contacting the inner peripheral wall surface of the opening 16. The fulcrum portion 22 is formed at the projecting end portion of the first resilient claw 25a, as discussed above.

Thus, the manipulation knob 5 can be installed in place in the opening 16 by simply inserting the manipulation knob 5 into the opening 16 through the snap action of the first and second resilient claws 25a, 25b, and thereby the installation of the manipulation knob 5 is eased. The gauge plate 2 and the lens member 9 are installed upon the engagement of the first resilient claw 25a with the side wall surface (the right side wall surface in FIG. 3) of the annular projection 15a of the case 15 on the switch 7 side of the annular projection 15a.

In the present embodiment, the resin spring portion 25e, which is molded integrally and continuously with the manipulation knob 5, is used, so that the costs can be reduced in comparison to the case where the separate metal spring is used. Furthermore, the resin spring portion 25e is formed in tandem (in series) with the manipulation knob 5 (more specifically, the projection 5d of the manipulation knob 5). Also, the resin spring portion 25e is resiliently bendable only in the axial direction of the manipulation knob 5 without expanding in the direction perpendicular to the axial direction of the manipulation knob 5. Therefore, the size of the manipulation knob 5 (including the resin spring portion 25e) measured in the direction perpendicular to the axial direction of the manipulation knob 5, i.e., measured in the top-to-bottom direction in FIG. 3 is not increased. Particularly, in the present embodiment, the size of the resin spring portion 25e, which is measured in the direction perpendicular to the axial direction of the manipulation knob 5, is equal to or smaller than a size of the switch head 7a, which is measured in the direction perpendicular to the axial direction of the manipulation knob 5. Thereby, the space saving is possible.

Furthermore, in the holding state of the manipulation knob 5 shown in FIG. 3, in which the manipulation knob 5 is not depressed by the occupant, the manipulation knob 5 is held such that the manipulation knob 5 contacts the one side of the inner peripheral portion of the through-hole 10 of the lens member 9, which is the component of the instrument. In this holding state, there is satisfied a relationship of a minimum force Fh, which needs to be applied to the manipulation knob 5 from the axial side where the switch 7 is located to hold the manipulation knob 5 in the contact state<the resilient reaction force Fe of the resin spring portion 25e<a maximum reaction force Fs of the switch 7 in the state where the switch 7 is not fully depressed to execute the corresponding switching operation. The minimum force Fh, which is required to hold the manipulation knob 5, is set to be 0.6 N in this particular embodiment.

In this way, the switch 7 is not switched on in the assembled state where the manipulation knob 5 is installed in place in the opening 16. Furthermore, when the manipulation knob 5 is pressed toward the switch 7, the manipulation knob 5, which is held in the stationary state, is driven toward the switch 7. Therefore, the reaction force of the resin spring portion 25e and the reaction force of the switch 7 are increased, and the switch 7 is finally turned on. Here, the present embodiment may be modified such that the switch 7 is turned off when the manipulation knob 5 is depressed by the occupant, if desired.

The resin spring portion 25e enables the switching operation of the switch 7 through the manipulation knob 5 even in a state where a predetermined reaction force of the switch 7 cannot be obtained due to a tolerance variation of each corresponding component. That is, the resin spring portion 25e can compensate a shortage of the reaction force of the switch 7 caused by a variation within the manufacturing tolerance of each corresponding component.

Furthermore, when the switch 7 is turned on, the CPU (not shown), which receives the signal from the switch 7, changes the display of the digital odometer/trip meter 4 shown in FIG. 1. Furthermore, the manipulation knob 5 is tilted such that the manipulation knob 5 contacts the one side (lower side in FIG. 3) of the inner peripheral portion of the through-hole 10 of the lens member 9, which is the component of the speedometer 1 and through which the manipulation knob 5 extends. Therefore, it is possible to limit generation of noises, which would be generated by repeated collisions of the manipulation knob 5 against the inner peripheral portion of the through-hole 10 of the lens member 9 upon vibrations of the manipulation knob 5 caused by vibrations of the vehicle. Furthermore, in the present embodiment, the manipulation knob 5 is depressible to switch the switch 7 and is not rotatable. Alternatively, the manipulation knob 5 may be configured to rotate in order to perform a corresponding function (e.g., adjusting the brightness of the illumination of the instrument), if desired.

In the present embodiment, the manipulation knob 5, the switch 7, the printed circuit board 8, the case 15 and the lens member 9 may serve as a switching device 100 of the speedometer (instrument) 1, through which the operational mode of the odometer/trip meter (indicator) 4 is changeable, while the printed circuit board 8, the case 15 and the lens member 9 serve as common components, which are common to the speedometer (instrument) 1 or the instrument panel having the speedometer 1.

The present invention is not limited to the above embodiment. That is, the above embodiment may be modified as follows. For example, in the above embodiment, the manipulation knob is the trip knob, which is provided to the speedometer. The manipulation knob (and thereby the switching device and the indicator) may be provided to any other part of the instrument panel, which is other than the speedometer. Furthermore, the manipulation knob (and thereby the switching device) of the present invention is not limited to that of the digital odometer/trip meter. That is, the manipulation knob (and thereby the switching device) of the present invention may be applicable as a manipulation knob (and thereby a switching device) for manipulating an illumination or an indicator lamp of the vehicle or a manipulation knob (and thereby a switching device) for resetting or manipulating various devices, such as a clock of the vehicle. In addition, the manipulation knob (and thereby the switching device) of the present invention may be applicable as a manipulation knob (and thereby a switching device) for changing displayed information from one information (e.g., an average fuel consumption of the vehicle) to another information (e.g., a distance-to-empty) on an indicator other than the odometer/trip meter.

Besides the changing of the display of the odometer/trip meter or resetting of the trip meter, the manipulation knob (and thereby the switching device) of the present invention may be used as, for example, a manipulation knob (a switching device) to turn off the indicator lamp, which has been in a turned-on state, upon depressing of the manipulation knob by the occupant. Furthermore, the manipulation knob (and thereby the switching device) of the present invention may be used for meters (indicators) other than the automobile indicators. For example, the manipulation knob (and thereby the switching device) of the present invention may be used as a manipulation knob (and thereby a switching device) of other vehicles (e.g., trains, airplanes) or of an instrument (indicator) of a factory where the instrument is subject to large vibrations.

In the above embodiment, the resin spring portion 25e is formed as the spiral spring. However, the configuration of the resin spring portion 25e is not limited to the spiral spring. For instance, the resin spring portion 25e may be formed as a cantilever spring, which has one end connected to the resin thin piece 25e1 and the other end having the cylindrical protrusion 25e2. Even with this modification, advantages similar to those discussed above can be implemented.

In the above embodiment, the cylindrical protrusion 25e2 is located above the central axis 5s of the manipulation knob 5, i.e., is located on the one side of the central axis 5s of the manipulation knob 5, which is opposite from the fulcrum portion 22 in the direction perpendicular to the central axis 5s of the manipulation knob 5. However, the present invention is not limited to this. That is, as long as the force, which is applied to the manipulation knob 5 through the cylindrical protrusion 25e2, causes the tilting of the manipulation knob 5 to urge the manipulation knob 5 against the one side of the inner peripheral portion of the through-hole 10 of the lens member 9, the location of the cylindrical protrusion 25e2 may be changed to any other appropriate location. For instance, the manipulation knob 5 may be centered at the central axis 5s of the manipulation knob 5. Further alternatively, the cylindrical protrusion 25e2 may be placed on the other side of the central axis 5s of the manipulation knob 5 where the fulcrum portion 22 is located.

Furthermore, in the above embodiment, the gap 25g is eliminated in the holding state shown in FIG. 3. Alternatively, a smaller gap, which is smaller than the gap 25g shown in FIG. 5, may be provided between the projection 5d and the resin spring portion 25e in the holding state shown in FIG. 3, if desired. In such a case, this gap may be eliminated at the time when the manipulation knob 5 is depressed by the user to change the display on the odometer/trip meter 4 or any other indicator.

Furthermore, in the above embodiment, the number of the spring 7c of the switch 7 is one. Alternatively, the switch 7 may have more than one spring, if desired. For instance, the switch 7 may have a double spring (i.e., first and second springs coaxially arranged with each other). In such a case, the spring constant of the resin spring portion 25e may be smaller than a spring constant of the double spring.

Additional advantages and modifications will readily occur to those skilled in the art. The invention in its broader terms is therefore not limited to the specific details, representative apparatus, and illustrative examples shown and described.

What is claimed is:

1. A switching device for an instrument, comprising:
   a manipulation knob that is molded from a resin material and is manually depressible; and
   a switch that is depressible through the manipulation knob to execute a corresponding switching operation when the manipulation knob is depressed, wherein:
   the manipulation knob includes a resin spring portion, which is molded integrally with the manipulation knob and projects in an axial direction of the manipulation knob;
   the switch is placed along a central axis of the manipulation knob;
   the resin spring portion is resilient and is adapted to exert a resilient reaction force against the switch when the manipulation knob is depressed to depress the switch; wherein:
   the resin spring portion has a protrusion, which projects toward the switch in the axial direction of the manipulation knob and contacts the switch; and
   the protrusion of the resin spring portion is located on one side of the central axis of the manipulation knob in a direction perpendicular to the central axis of the manipulation knob.

2. A switching device for an instrument, the switching device comprising:
   a single piece manipulation knob that is molded from a resin material and is manually depressible; and
   a switch that is depressible through the manipulation knob to execute a corresponding switching operation when the manipulation knob is depressed, wherein:
   the manipulation knob includes a resin spring portion, which is molded integrally with the manipulation knob and projects in an axial direction of the manipulation knob;
   the switch is placed along a central axis of the manipulation knob;
   the resin spring portion is resilient and is adapted to exert a resilient reaction force against the switch when the manipulation knob is depressed to depress the switch; and
   the resin spring portion projects from an end portion of the manipulation knob, which is located on an axial side where the switch is placed;
   the resin spring portion has only a single turn that is wound about an axis, which is generally parallel with the central axis of the manipulation knob;
   the resin spring portion has a protrusion, which axially protrudes toward the switch; and
   the protrusion of the resin spring portion directly contacts the switch to operate the switch when the manipulation knob is depressed toward the switch.

3. The switching device according to claim 2, wherein:
   the resin spring portion projects spirally from a rest of the manipulation knob; and
   a projecting end part of the resin spring portion contacts the switch.

4. The switching device according to claim 2, further comprising a transparent cover, which is spaced from the switch in the axial direction of the manipulation knob and includes a through-hole, through which the manipulation knob is received, wherein the manipulation knob is tilted by the resilient reaction force of the resin spring portion, so that the manipulation knob is held in a contact state wherein the manipulation knob contacts one side of an inner peripheral portion of the through-hole of the transparent cover and is spaced from an opposite side of the inner peripheral portion of the through-hole of the transparent cover, which is opposite from the one side of the inner peripheral portion of the through-hole of the transparent cover in a direction generally perpendicular to the axial direction of the manipulation knob.

5. The switching device according to claim 4, further comprising a case, which is placed on one side of the transparent cover in the axial direction of the manipulation knob where the switch is located, wherein:
- the manipulation knob includes a fulcrum portion, which contacts the case; and
- the manipulation knob is tilted about the fulcrum portion by the resilient reaction force of the resin spring portion and thereby contacts the one side of the inner peripheral portion of the through-hole of the transparent cover.

6. The switching device according to claim 5, further comprising a printed circuit board, to which the switch is securely installed, wherein:
- the case includes an opening, through which the manipulation knob is received;
- a support portion is formed in the opening of the case to support the fulcrum portion of the manipulation knob;
- the manipulation knob further includes first and second resilient claws, which project radially outwardly and are formed integrally with the manipulation knob;
- the first and second resilient claws are radially inwardly bendable to reduce a distance between the first and second resilient claws at time of inserting the resin spring portion into the opening of the case and are radially outwardly expandable to increase the distance between the first and second resilient claws upon the inserting of the resin spring portion in place in the opening of the case; and
- the fulcrum portion is formed at a projecting end portion of the first resilient claw.

7. The switching device according to claim 4, wherein the switching device satisfies a relationship of a minimum force, which needs to be applied to the manipulation knob from an axial side where the switch is located to hold the manipulation knob in the contact state<the resilient reaction force of the resin spring portion<a maximum reaction force of the switch in a state where the switch is not fully depressed to execute the corresponding switching operation.

8. The switching device according to claim 4, further comprising a case, which is placed on one side of the transparent cover in the axial direction of the manipulation knob where the switch is located, wherein:
- the case includes an opening, through which the manipulation knob is received;
- an annular projection radially inwardly projects from a peripheral wall of the opening;
- the manipulation knob includes first and second resilient claws, which are formed integrally with the manipulation knob and are placed between the resin spring portion of the manipulation knob and the annular projection of the case in the axial direction of the manipulation knob;
- the first and second resilient claws are diametrically opposed to each other about the central axis of the manipulation knob and radially outwardly extend from the manipulation knob to project in a direction away from the switch in the axial direction of the manipulation knob;
- a projecting end portion of the first resilient claw contacts the annular projection of the case and forms a fulcrum portion, about which the manipulation knob is tiltable; and
- a projecting end portion of the second resilient claw is axially spaced away from the annular projection of the case.

9. The switching device according to claim 8, wherein:
- the manipulation knob further includes an arcuate ridge, which is formed integrally with the manipulation knob and has an arcuate outer surface that slidably contacts an inner peripheral surface of the annular projection of the case; and
- the arcuate outer surface of the arcuate ridge extends along an imaginary arc, a center of which is located in the fulcrum portion of the first resilient claw.

10. The switching device according to claim 2, wherein: the switch includes:
- a switch housing;
- at least one spring that is received in the switch housing; and
- a switch head that is received in the switch housing and is urged by the at least one spring toward the manipulation knob;
- the switch head is depressible through the manipulation knob to execute the corresponding switching operation when the manipulation knob is depressed; and
- a spring constant of the resin spring portion is smaller than a spring constant of the at least one spring of the switch.

11. The switching device according to claim 10, wherein a size of the resin spring portion, which is measured in a direction perpendicular to the axial direction of the manipulation knob, is equal to or smaller than a size of the switch head, which is measured in the direction perpendicular to the axial direction of the manipulation knob.

12. The switching device according to claim 2, wherein the resin spring portion is resiliently bendable only in the axial direction of the manipulation knob without expanding in a direction perpendicular to the axial direction of the manipulation knob.

13. An instrument for a vehicle, comprising:
- the switching device of claim 2; and
- an indicator, an operational mode of which is changeable through the switching device.

14. The switching device according to claim 2, wherein when the manipulation knob is depressed to depress the switch, the resin spring portion resiliently deforms and depress the switch with a distal end surface of the resin spring portion.

15. The switching device according to claim 2, wherein the resin spring projects spirally in a plane generally perpendicular to the central axis of the manipulation knob.

16. The switching device according to claim 2, wherein the resin spring projects spirally around an axis generally parallel with the central axis of the manipulation knob.

17. The switching device according to claim 2, wherein:
- the resin spring portion is formed in a distal end portion of the manipulation knob, which is opposite from a proximal end portion of the manipulation knob in the axial direction of the manipulation knob; and
- a size of the resin spring portion, which is measured in a direction perpendicular to the axial direction of the manipulation knob, is smaller than a size of the proximal end portion of the manipulation knob, which is measured in the direction perpendicular to the axial direction of the manipulation knob.

18. The switching device according to claim 2, wherein the manipulation knob includes a rod form that extends from a first terminal end which is adapted to be manually depressed to a second terminal end opposite to the first terminal end, the resin spring portion extending from the second terminal end in the axial direction of the manipulation knob.

19. The switching device according to claim 2, wherein the manipulation knob includes a rod form, a flange disposed at a terminal end of the rod form and a projection extending from the flange in the axial direction of the manipulation knob away from the rod form, the resin spring portion extending from the projection in the axial direction of the manipulation knob away from the rod form.

20. The switching device according to claim 2, wherein the resin spring projects spirally in a plane generally perpendicular to the central axis of the manipulation knob, the resin spring including a planar surface parallel with the plane generally perpendicular to the central axis of the manipulation knob.

21. The switching device according to claim 2, wherein the resin spring projects spirally around an axis generally parallel with the central axis of the manipulation knob, the resin spring including a planar surface parallel with a plane generally perpendicular to the central axis of the manipulation knob.

\* \* \* \* \*